United States Patent [19]

Spear

[11] 3,738,092
[45] June 12, 1973

[54] ROTARY MOWER INCLUDING SHARPENER AND METHOD

[76] Inventor: Herbert W. Spear, 1526 E. 4th St., Santa Ana, Calif. 92701

[22] Filed: Jan. 17, 1972

[21] Appl. No.: 218,226

[52] U.S. Cl.................................. 56/12.1, 56/295
[51] Int. Cl........................................... A01d 35/26
[58] Field of Search .................. 56/12.1, 255, 295; 76/82.1; 51/249, 250

[56] References Cited
UNITED STATES PATENTS

| | | | |
|---|---|---|---|
| 2,826,032 | 3/1958 | Hayes | 56/255 |
| 3,136,107 | 6/1964 | Spear | 56/12.1 |
| 3,225,527 | 12/1965 | Spear | 56/12.1 |

Primary Examiner—Louis G. Mancene
Assistant Examiner—J. N. Eskovitz
Attorney—Mark Mohler, Dirks B. Foster, Bruce W. Schwab et al.

[57] ABSTRACT

A mower having cutting blades revolvable in a horizontally disposed, circular annular path about, and equally spaced from, the axis of a vertical shaft operably connected with said blades for driving them in one direction in said path. A motor on said mower is connected with said shaft for driving it at a relatively slow idling speed, and a relatively high cutting speed, and a blade supporting mechanism between said blades and said shaft automatically supports said blades in cutting positions under the influence of centrifugal force at said high cutting speed with the cutting edges of said blades directed downwardly and forwardly relative to their direction of movement. At idling speed the blades automatically rotate about horizontal axes to positions with their cutting edges directed upwardly and forwardly, and a circular sharpening stone coaxial with the vertical axis of the shaft supporting said blades is spaced above said blades for lowering to engage the bevel for the cutting edges to sharpen the blades during said idling speed, which stone is then elevated above the blades and releasably held.

3 Claims, 7 Drawing Figures 3,738,092
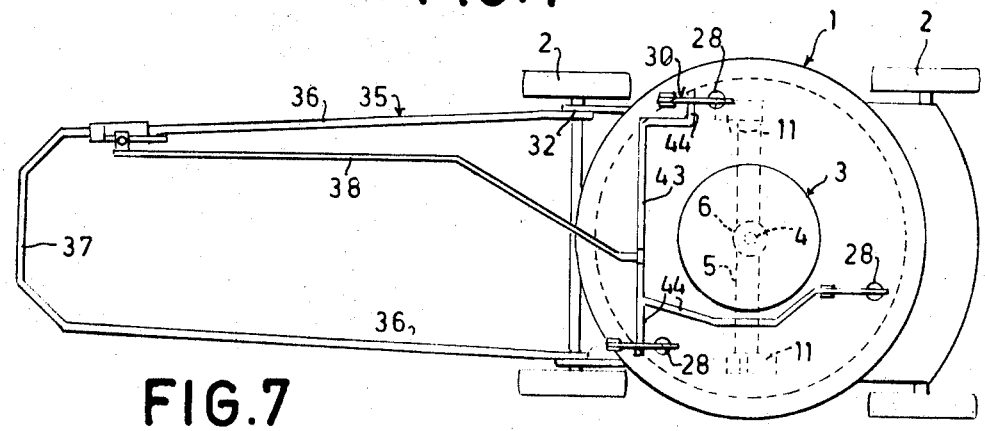
FIG.1
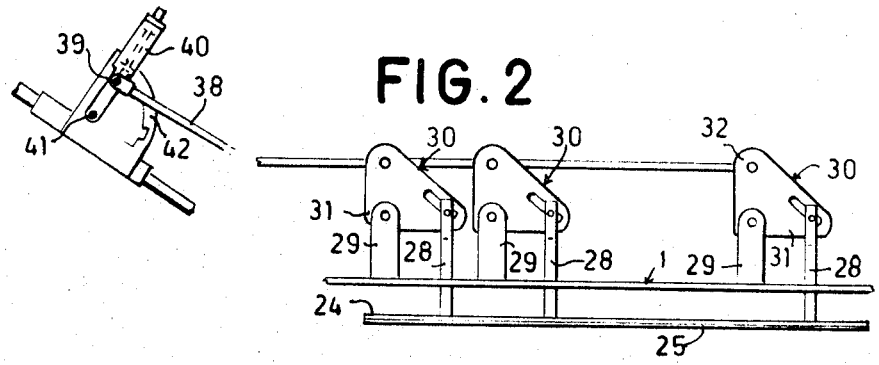
FIG.7
FIG.2
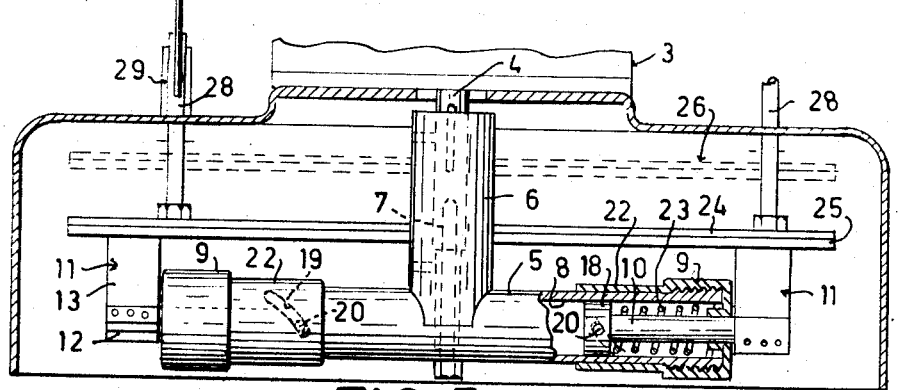
FIG.3
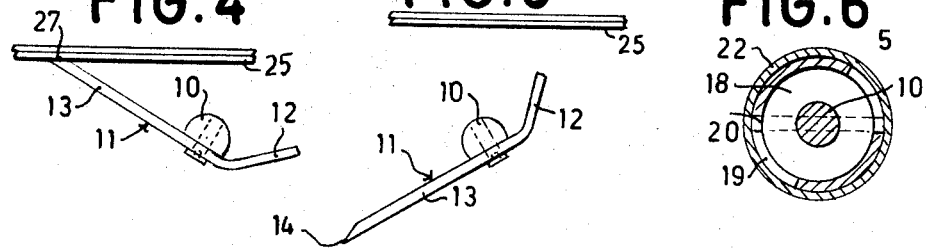
FIG.4  FIG.5  FIG.6

ROTARY MOWER INCLUDING SHARPENER AND METHOD

SUMMARY

This invention is an improvement on the invention disclosed in my United States Letters Patent Nos. 3,136,107 of June 9, 1964 and 3,225,527 of Dec. 28, 1965.

One of the objects of the invention is the provision of structure in which the cutting blades of a rotary type mower are quickly and automatically out of cutting positions for sharpening while the blades are revolving about the axis of the power driven shaft supporting them, and are moved to a sharpening position for engagement with a sharpening stone or sharpening device that is supported on the mower for movement into sharpening engagement with the blades. The foregoing is accomplished by the operator at the handle of the mower while the mower is on the ground in mowing position and the blades are revolved under power from the motor of the mower.

Another object of the invention is the provision of structure in a rotary type mower in which an annular sharpening stone or device, coaxial with the vertical axis of revolution of the blades, is supported above the circular path of the blades, and which blades are supported for movement, during their aforesaid revolution, from cutting positions with their cutting edges facing forwardly and downwardly relative to the direction of said revolution, to sharpening positions with said cutting edges facing forwardly and upwardly for engagement of the bevel along said cutting edges with said stone when the latter is lowered only when said blades are driven by the mower motor at relatively slow idling speed compared to their movement at cutting speed. Thus substantially eliminating the danger of de-tempering the blades.

A still further object of the invention is the provision of structure in a rotary type mower for safely and quickly sharpening the blades while they are revolved under power from the motor while the operator is at the handle of the mower and the latter is on the ground in mowing position.

An added object is the provision of an improved method for sharpening the blades on a rotary type mower by utilizing the centrifugal force developed at the blades at cutting speed for maintaining the blades in cutting positions, and for automatically moving the blades from cutting to sharpening positions under a constantly applied force overcoming said centrifugal force at a predetermined rate of revolution of said blades below said cutting speed.

Other objects and advantages will appear in the description and drawings.

DESCRIPTION OF DRAWINGS

FIG. 1 is a simplified top plan view of a rotary motor that incorporates my invention.

FIG. 2 is a fragmentary, semi-schematic side elevational view showing the lifting and lowering means for the sharpening stone or device.

FIG. 3 is an enlarged cross sectional view generally along line 3—3 of FIG. 1 with certain parts being partly in cross section, and the cutting blades being in sharpening positions against the sharpening stone.

FIG. 4 is a fragmentary enlarged detached end view of one of the cutting blades in sharpening position.

FIG. 5 is a view similar to that of FIG. 4 with the blade in cutting position.

FIG. 6 is an enlarged cross sectional view along line 6—6 of FIG. 3.

FIG. 7 is an enlarged, fragmentary, side elevational view of the manually graspable control element adjacent the outer end of the mower handle for raising and lowering the sharpening stone.

DESCRIPTION OF THE DISCLOSURE

Referring to FIG. 1 the mower housing is generally designated 1, being generally circular and having side walls and a top wall and an open lower side. Ground wheels 2 support the housing 1 for movement spaced over the ground, and the housing includes a conventional motor or internal combustion engine 3 having a driven shaft 4 that extends vertically downwardly into housing 1. The motor is substantially centrally positioned on the housing and is of the type adapted to be controlled by an operator for driving shaft 4 at a relatively slow idling speed, or at a relatively high cutting speed. The foregoing structure is common in rotary mowers, and is well known in the trade.

The term "rotary mower," as used herein, refers to the type that employs cutting blades operably connected with a motor for revolving about a vertical axis in a substantially horizontal circular path spaced above the ground. Whether or not the ground wheels are motor driven is immaterial, inasmuch as the invention is applicable to either type.

A horizontally elongated blade supporting member 5 (FIG. 3) is centrally secured between its ends to the lower end of a vertical tube 6 that, in turn, is releasably secured by a bolt 7 to the shaft 4. Thus the member 5 projects radially outwardly relative to the axis of shaft 4.

The radially outwardly projecting ends of member 5 are tubular, thereby providing bores 8 open at their outer ends (FIG. 3). A cap 9 is threadedly secured on each of the outer ends of the blade supporting member 5, each cap being formed with a central opening providing a bearing through a shaft 10 rotatably and reciprocably extends, and from which cap the outer end portion of said shaft projects.

Each shaft 10 is flat on one-side adjacent its outer terminal end and a cutting blade 11 is removably secured against the flattened side of said shaft by any suitable means, such as flat head "Allen screws" (FIG. 5).

Each blade 11 is a flat sided metal strip extending transversely across the flat side of each shaft adjacent to one end portion 12 of the strip, the end portion 12 being much shorter than the remainder 13 of the strip. The longer portion of each strip has its terminal outer end edge bevelled on its upper side to form a cutting edge 14. Said portion 13 extends angularly from portion 12 to the side of the blade against which the shaft 10 is secured.

The cutting edges 14 of blades 11 at opposite ends of the member 5 face in opposite directions to the leading relative to the direction of movement of the blades upon revolving when shaft 10 is rotated. Said longer portions of the blades that have the cutting edges at their terminal ends extend slantingly downwardly, and forwardly relative to direction of movement of the blades about the axis of shaft 4, which is the cutting position of each blade. In this cutting position, the portion 12, or tail of each blade extends upwardly (FIG. 5).

Each shaft 10 has a cylindrical head 18 (FIGS. 3, 6) on its inner end, which head is rotatably and reciprocably fitted within bore 8 of member 5. The walls of said member are formed with a helically extending slot 19 in opposite sides along the portions of bore 7 within which the heads 18 are movable, and a pin 20 (FIG. 6) extends transversely through each head 18 and projects at its ends into the slots. A skirt or unthreaded extension 22 of each cap 9 extends across said slots and the ends of pins 20 (FIG. 3).

The directions and lengths of slots 19 are such that when the projecting ends of the pins are at one of the outer ends of the slots the blades will be in the cutting position of FIG. 5, and when the pins are at the opposite ends of the slots, the blades will be in the full line positions of FIGS. 3 and 4. Axial movement of the shafts 10 in an outward direction will effect rotation of the blades to the cutting position shown in FIG. 5.

An expansion spring 23 reacts between the head of each cap 9 and the head 18 on each shaft 9 to yieldably urge each of the blades 14 out of cutting position to the position shown in FIG. 4.

A horizontally disposed circular metal disc 24 (FIG. 3) is positioned within the housing 1 coaxial with shaft 4 and spaced above the member 5. This disc has an annular sharpening stone 25 bonded or secured to its lower surface, and which stone is coaxial with the disc 24. The circular inner and outer peripheries of the stone 25, at the least, define the inner and outer boundaries of the annular path of the cutting edges of blades 11. It is accordingly seen that if the stone is lowered from the upper broken line position 26 (FIG. 5) to the full line position, the upwardly directed bevel 27 (FIG. 4) along the cutting edge 14 of each blade 10 will engage the stone, and said blade will be sharpened during revolution of the blade about the axis of shaft 4.

Vertical rods 28 are secured at their lower ends to the metal disc 24 and slidably extend upwardly through openings in the upper wall of housing 1 (FIG. 3). Preferably these rods are at equally spaced points around the disc 24 so that the disc and stone 25 will remain in a uniform plane parallel with the path of blades 10 during raising and lowering said disc.

Upstanding supports 29 are rigid relative to housing 1, there being one support adjacent to and spaced rearwardly of each upwardly projecting rod 28. The words "rearwardly" and "forwardly" and words of similar connotation are used with respect to the normal direction of movement of the mower during cutting (FIGS. 1, 2).

A crank 30 has one arm 31 pivotally connected to each support 29 and projects forwardly of said support with the other arm 32 pivotally connected to the upper end of each rod 28.

The body of the mower, which includes the housing 1, has a U-shaped handle generally designated 35, providing a pair of arms 36. The terminal forward end portions of said arms are connected at 32 with suitable brackets connected with said body. Said handle extends rearwardly from its forward end, and the closed end 37 of the U at the rear end of the handle provides a bar for manual grasping by an operator.

The conventional motor or engine controls (not shown) extend along the handle to a point within reach of the operator, so the speed of the engine or motor may be manually regulated for idling when the mower is stationary and for operating at a relatively high speed when the mower is moved for cutting. The rate of revolution of the blades is relatively slow when the motor is idling and the mower is stationary, and is relatively fast when the mower is moved for cutting. This condition is the same whether the mower is manually moved or is motorized.

A control rod 38 extends along one of the handles 36 to a point adjacent its rear end where it is pivotally connected at 39 with a manually graspable control handle 40, the latter being pivoted at 41 to a suitable segment 42 rigid with the arm 36 adjacent thereto. (FIG. 7)

Said rod 38 is connected at its forward end with a horizontal cross rod 43 (FIG. 1).

I claim:

1. In a rotary mower that includes a wheel mounted, downwardly opening housing and a vertical shaft rotatably depending in said housing having radially outwardly extending arms each supporting a cutting blade at its outer end for movement of the blades in an annular path in one direction at a relatively low idling speed and at a relatively high cutting speed, each blade having a cutting edge facing in said one direction, and a motor on said housing manually controllable for operation at a relatively low idling speed and a relatively high cutting speed, said motor being connected with said shaft for rotating said shaft, and arms as a unit about the axis of said shaft for moving said blades in said path at an idling speed and at said cutting speed, the improvement comprising:

a. blade supporting means movable under the influence of centrifugal force upon movement of said blades in said annular path at said cutting speed for moving said blades about the axes of said arms from elevated non-cutting positions of the cutting edges of said blades to lowered cutting positions of said cutting edges and vice versa, b. yieldable means reacting between said blade supporting means and said arms for moving said blades from said lowered positions of their cutting edges to elevated non-cutting positions of said cutting edges upon the said blades moving in said annular path at said idling speed, c. an annular, planar blade sharpening stone coaxial with said shaft and path extending over and parallel with the plane of the latter, d. means supporting said sharpening stone for downward movement to a sharpening position with engagement with said blades along their cutting edges when said edges are in said elevated non-cutting positions for sharpening said blades while they are moving in said path at said idling speed, and e. means connected with said stone for moving the latter downwardly to its said sharpening position and vice versa.

2. In a rotary lawn mower as defined in claim 1;

f. said arms having a longitudinal bore in the outer end portion of each arm, and the blade supporting means for each blade comprising a shaft revolvable and reciprocably supported in each bore, g. guide means respectively on said end portion of each arm and on said shaft in engagement with each other for affecting movement of said shaft and blade along a helical path upon movement of said shaft outwardly under said influence of centrifugal force for rotating each of said blades to move its cutting edge to said lowered cutting position, h. said shaft having an enlargement thereon within said bore and each arm having an apertured cap at its outer end through which said shaft rotatably and reciprocably extends, and
i. said yieldable means being an expansion spring around said shaft between said enlargement and said cap.

3. In a lawn mower as defined in claim 1;
f. said housing having a generally horizontally disposed upper wall supporting said motor, and a plurality of openings formed in said upper wall around said motor,
g. said stone including a rigid backing plate of metal secured thereto and positioned thereover,
h. said means supporting said sharpening stone for vertical reciprocable movement including vertical rods secured at their lower ends to said plate and extending through said openings in said upper wall of said housing,
i. and manually actuatable means connected with said rods and accessible to an operator in operative position for operating said mower and for regulating the speed of said motor for raising and lowering said rods and consequently said stone.

* * * * *